US012601022B2

(12) United States Patent
Odenthal et al.

(10) Patent No.: US 12,601,022 B2
(45) Date of Patent: Apr. 14, 2026

(54) METHOD FOR SIMULTANEOUSLY INJECTING A FUEL GAS AND AN OXYGEN-RICH GAS INTO A UNIT

(71) Applicant: SMS group GmbH, Düsseldorf (DE)

(72) Inventors: Hans-Jürgen Odenthal, Mettmann (DE); Andreas Kemminger, Düsseldorf (DE); Peter Starke, Duisburg (DE); Ralf Nörthemann, Sprockhövel (DE)

(73) Assignee: SMS group GmbH, Düsseldorf (DE)

( * ) Notice: Subject to any disclaimer, the term of this patent is extended or adjusted under 35 U.S.C. 154(b) by 538 days.

(21) Appl. No.: 18/019,112

(22) PCT Filed: Jul. 13, 2021

(86) PCT No.: PCT/EP2021/069475

§ 371 (c)(1),
(2) Date: Feb. 1, 2023

(87) PCT Pub. No.: WO2022/028823

PCT Pub. Date: Feb. 10, 2022

(65) Prior Publication Data

US 2023/0279516 A1 Sep. 7, 2023

(30) Foreign Application Priority Data

Aug. 3, 2020 (DE) ..................... 10 2020 209 756.9
Jan. 6, 2021 (DE) ..................... 10 2021 200 059.2

(51) Int. Cl.
*C21C 5/46* (2006.01)
*C21C 5/32* (2006.01)
(Continued)

(52) U.S. Cl.
CPC .............. *C21C 5/4606* (2013.01); *C21C 5/32* (2013.01); *C21C 5/5217* (2013.01); *F27B 3/225* (2013.01);
(Continued)

(58) Field of Classification Search
CPC ....... C21C 5/4606; C21C 5/32; C21C 5/5217; F27B 3/225; F27B 3/22; F27D 3/16;
(Continued)

(56) References Cited

U.S. PATENT DOCUMENTS 3,638,932 A * 2/1972 Masella ................ C21C 5/4606 239/132.3
5,490,775 A * 2/1996 Joshi ....................... F23D 14/22 431/187
(Continued)

FOREIGN PATENT DOCUMENTS

DE 102011002616 A1 12/2011
DE 102013226109 A1 1/2015
(Continued)

OTHER PUBLICATIONS

Odenthal H-J, Schlüter J, Lachmund H & Bruckhaus R (2013) Verbesserte Blas- und Spülbedingungen im BOF-Prozess. Stahl Eisen 133(9): 43-59.
(Continued)

*Primary Examiner* — Jessee R Roe
*Assistant Examiner* — Michael Aboagye
(74) *Attorney, Agent, or Firm* — Smartpat PLC

(57) ABSTRACT

A burner comprises a primary nozzle for injecting an oxygen-rich gas. The primary nozzle is designed as a supersonic nozzle. A coaxial nozzle having an annular outlet opening is provided for injecting a fuel gas. The coaxial nozzle is designed as a subsonic nozzle and is coaxial to the primary nozzle. The primary nozzle has a convergent portion and a divergent portion, which adjoin each other at a radius of the narrowest cross-section. The annular outlet opening is located at an end face of the burner. The fuel gas, in the form of hydrogen or a mixture of hydrogen and a hydrocarbon-containing gas, is injected at a fixed inlet pressure and a fixed
(Continued)

inlet volumetric flow rate, with respect to a planned thermal power of the burner. In contrast, the inlet pressure and the inlet volumetric flow rate of the oxygen-rich gas are varied according to the application.

8 Claims, 5 Drawing Sheets

(51) Int. Cl.

| | |
|---|---|
| ***C21C 5/52*** | (2006.01) |
| ***F27B 3/22*** | (2006.01) |
| ***F27D 3/16*** | (2006.01) |
| ***F27D 99/00*** | (2010.01) |

(52) U.S. Cl.
CPC ........... *F27D 3/16* (2013.01); *F27D 99/0033* (2013.01); *F27D 2003/164* (2013.01); *F27D 2003/165* (2013.01); *F27D 2003/168* (2013.01)

(58) Field of Classification Search
CPC ........... F27D 99/0033; F27D 2003/164; F27D 2003/165; F27D 2003/168; Y02P 10/143
USPC .................................. 266/225, 200, 44, 268
See application file for complete search history.

(56) References Cited

U.S. PATENT DOCUMENTS

| | | | | |
|---|---|---|---|---|
| 6,171,100 | B1 * | 1/2001 | Joshi | C03B 5/2353 431/189 |
| 6,514,310 | B2 * | 2/2003 | Allemand | C21C 5/5217 75/553 |
| 7,452,401 | B2 | 11/2008 | Mahoney et al. | |
| 7,611,563 | B2 * | 11/2009 | Memoli | F23D 14/32 75/553 |
| 8,377,372 | B2 * | 2/2013 | Gautam | C21C 5/4606 266/225 |
| 9,221,704 | B2 * | 12/2015 | D'Agostini | F23D 14/32 |
| 2002/0035892 | A1 | 3/2002 | Allemand et al. | |
| 2003/0075843 | A1 * | 4/2003 | Wunsche | F27D 3/18 266/200 |
| 2008/0000325 | A1 | 1/2008 | Mahoney et al. | |
| 2013/0119168 | A1 | 5/2013 | Odenthal et al. | |

FOREIGN PATENT DOCUMENTS

| | | | |
|---|---|---|---|
| DE | 102018220242 | A1 | 9/2019 |
| DE | 102018208433 | A1 | 12/2019 |
| EP | 3019634 | B1 | 5/2017 |
| WO | 2015004182 | A1 | 1/2015 |

OTHER PUBLICATIONS

Odenthal, Hans-Jürgen, Jan Bader, Ralf Nörthemann, Markus Reifferscheid, Igor Klioutchnikov, Herbert Olivier, and SMS Siemag AG. "The optimized SIS injector for EAF application." Proceedings of the AISTech (2014).
S. Schemberg, Wasserstoff—Energieträger und Brennstoff der Zukunft?, Montanuniversität Leoben—Nichteisenmetallugie, Nov. 28, 2019.

* cited by examiner

METHOD FOR SIMULTANEOUSLY INJECTING A FUEL GAS AND AN OXYGEN-RICH GAS INTO A UNIT

TECHNICAL FIELD

The present disclosure relates to a method for simultaneously injecting a fuel gas and an oxygen-rich gas into a unit, preferably into a metallurgical meltdown unit, by means of a burner. The disclosure further relates to a method for setting a flame pattern of a burner along with the use of a burner which comprises a primary nozzle designed as a supersonic nozzle for injecting the oxygen-rich gas and a coaxial nozzle designed as a subsonic nozzle, located coaxially to the primary nozzle, with an annular outlet opening for injecting the fuel gas.

BACKGROUND

Injectors for top blowing and injecting oxygen-rich gas into a molten metal with the aim of decarburizing the molten metal and simultaneously building up a reactive, protective foamed slag layer over the molten metal are already known from the prior art. Such injectors are also used to melt the scrap initially present in the meltdown unit, such as an EAF, by selectively introducing chemical energy in the form of combustible gases. Thereby, modern injectors may switch between two method modes, i.e. between injector operation and burner operation.

A corresponding injector is known, for example, from WO 2015/004182 A1, which comprises a primary nozzle designed as a supersonic nozzle for top blowing an oxygen-rich gas onto a molten metal and a secondary nozzle located coaxially with the primary nozzle for generating a coaxial jet surrounding the gas jet exiting from the primary nozzle, wherein the primary nozzle has a convergent portion and a divergent portion, which adjoin each other at a radius of the narrowest cross-section r*, and wherein the primary nozzle and the secondary nozzle are defined by a set of nozzle forms in their respective design cases.

SUMMARY

An injector for injecting oxygen-rich gas into a molten metal can operate in different phases, which are shown in FIGS. 1*a* to 1*c*.

Pilot mode, FIG. 1*a*, is a standby mode and is provided when the injector is inactive. The pilot flame consists of the combustion gas of the natural gas burner, which is ignited with a spark plug. The flame is monitored by an ionization electrode with evaluation electronics. The pilot flame prevents slag and melt droplets from adhering to the injector. The special nozzle geometry with the retracted, central primary nozzle and the concentrically located annular gap prevents clogging of the nozzle due to spattering effects on the part of the molten metal and slag.

In burner mode, FIG. 1B, thermal energy can be supplied to the meltdown unit. Oxygen and natural gas are conveyed unburned through the injector and mix in the furnace to form a combustible mixture that is ignited by the furnace atmosphere. Separate ignition by means of a spark plug is not required. The powerful flame supports the melting of the scrap in cold regions and homogenizes the melting pattern. The arrangement and control of the burners are considered holistically and coordinated with each other.

In the flat bath phase, the system switches to so-called injector mode, FIG. 1*c*. For the rapid decarburization of the molten metal, the optimum interaction of oxygen and molten metal is crucial. This is achieved by a supersonic jet that exits from the nozzle at about twice the speed of sound and hits the molten metal with high momentum. Similar to pilot mode, the integrated hot gas generator delivers an enveloping jet of hot combustion gas that envelops the cold oxygen jet, thereby increasing the length of the supersonic range.

In practice, it has been shown that the three different modes in which such an injector can operate no longer meet newer requirements.

Therefore, the present invention is based on the object of providing a method for simultaneously injecting a fuel gas and an oxygen-rich gas into a unit, in particular a metallurgical meltdown unit, by means of a burner that, in burner mode, permits operation in a design state and in a so-called off-design mode.

In accordance with the invention, the object is achieved by a method as claimed.

The method is provided for simultaneously injecting a fuel gas and an oxygen-rich gas into a unit, preferably a metallurgical meltdown unit, by means of a burner. The burner comprises a primary nozzle designed as a supersonic nozzle for injecting the oxygen-rich gas and a coaxial nozzle having an annular outlet opening for injecting the fuel gas, which coaxial nozzle is designed as a subsonic nozzle and is coaxial to the primary nozzle, wherein the primary nozzle has a convergent portion and a divergent portion, which adjoin each other at a radius of the narrowest cross-section, and wherein the annular outlet opening is located at an end face of the injector. In accordance with the invention, the fuel gas in the form of hydrogen or in the form of a fuel-gas mixture of hydrogen and a hydrocarbon-containing gas, in particular natural gas, is injected at a fixed inlet pressure and a fixed inlet volumetric flow rate, with respect to a planned thermal power of the burner, whereas the inlet pressure and the inlet volumetric flow rate of the oxygen-rich gas are varied according to the application.

Similarly, the invention provides for the use of the method in accordance with the invention to adjust a flame pattern of the burner.

In another aspect, the disclosure further provides for the use of a burner comprising a primary nozzle for injecting the oxygen-rich gas, which primary nozzle is designed as a supersonic nozzle and a coaxial nozzle having an annular outlet opening for injecting the fuel gas, which coaxial nozzle is designed as a subsonic nozzle and is coaxial to the primary nozzle, wherein the primary nozzle has a convergent portion and a divergent portion, which adjoin each other at a radius of the narrowest cross-section, and wherein the annular outlet opening is located at an end face of the burner, for simultaneously injecting a fuel gas and an oxygen-rich gas into a metallurgical meltdown unit, wherein the fuel gas, in the form of hydrogen or in the form of a fuel-gas mixture of hydrogen and a hydrocarbon-containing gas, more particularly natural gas, is injected at a fixed inlet pressure and a fixed inlet volumetric flow rate, with respect to a planned thermal power of the burner, whereas the inlet pressure and the inlet volumetric flow rate of the oxygen-rich gas are varied according to the application.

With the method in accordance with the disclosure, pure hydrogen or a fuel-gas mixture of hydrogen and a hydrocarbon-containing gas is injected into the unit. The fuel-gas mixtures are individually premixed in the range of 1 to 100% by volume, for example in a valve station, and injected into the unit via the coaxial nozzle, where the fuel gas or fuel-gas mixture can be ignited.

One advantage of blending hydrogen with the hydrocarbon-containing gas is that it allows a flexible response to rising $CO_2$ prices in the future.

With respect to the planned thermal power of the burner, the corresponding fuel gas is injected with a fixed inlet pressure and a fixed inlet volumetric flow rate, whereas the inlet pressure and the inlet volumetric flow rate of the oxygen-rich gas vary according to the application. By selectively adjusting the inlet pressure along with the inlet volumetric flow rate of the oxygen-rich gas, a complex shock pattern is created outside the burner, which influences and thus controls the mixing with the surrounding fuel gas. This allows, for example, a delayed mixing of fuel gas and oxygen-rich gas, such that the latter ignites only downstream of the burner outlet and combustion can take place at lower combustion temperatures. If a nitrogen-containing atmosphere prevails in the meltdown unit, this can significantly reduce the formation of thermal NOX gases.

By means of the method in accordance with the invention, the burner can be operated specifically in the so-called design state and in the non-adapted state (off-design mode), by which the burner can be adjusted or controlled, as the case may be, specifically with regard to the burner output along with the flame pattern.

A design state is present if, for a correctly designed Laval nozzle, the actual inlet pressure and inlet volumetric flow rate correspond to the so-called design pressure and design volumetric flow rate. The pressure at the outlet of the primary nozzle then corresponds to the ambient pressure. In the design state, the oxygen-rich gas exits from the primary nozzle with maximum impulse flow, wherein the structure of the so-called supersonic free jet—in contrast to the classic subsonic free jet—is formed to be undisturbed and coherent. Consequently, its flame length is also maximum. Therefore, the flame pattern is less pulsating.

In the design state, delayed combustion of the fuel gas takes place, which consequently leads to a lower combustion temperature and to a lower thermal load on the burner and the refractory lining of the meltdown unit. An additional advantage is the lower NOX values.

By contrast, the non-adapted state (off-design mode) results in more intensive mixing of fuel gas and oxygen-rich gas due to large-scale vortex structures and transport of the well-mixed, ignitable gas mixture away from the burner tip, which also ensures a lower thermal load on the burner. In contrast to the design state, the flame pattern exhibits a more spatially and temporally unsteady, transient operating behavior. By successively reducing or increasing the inlet pressure and the inlet volumetric flow rate, the flame pattern can be changed in a targeted manner.

In the non-adapted state (off-design mode), the burner can be operated in an over-expanded or an under-expanded state.

An over-expanded state is characterized by a smaller inlet pressure at the inlet of the primary nozzle compared to the design pressure. At the outlet of the primary nozzle, the oxygen-rich gas expands more than intended by the design state, such that so-called compression shocks are formed. As a result, more fuel gas is drawn into the oxygen-rich gas or the oxidizer free jet, as the case may be, and combustion occurs much earlier.

If, on the other hand, the inlet pressure is greater than the design pressure, the so-called under-expanded state is present. Expansion waves attach to the outlet edge of the primary nozzle and the oxidizer free jet expands outside the primary nozzle. Moreover, in the under-expanded state, the coaxially outflowing fuel gas mixes intensively with the oxygen-rich gas in such a manner that the flame becomes even shorter and even wider than in the over-expanded state.

Thus, in accordance with the invention, in certain situations the design state can be left specifically in order to generate a short flame or an even shorter flame in burner mode, for example to melt down scrap in the vicinity of a reactor wall of the meltdown unit.

Further advantageous embodiments of the invention are indicated in the dependent formulated claims. The features listed individually in the dependent formulated claims can be combined with one another in a technologically useful manner and can define further embodiments of the invention. In addition, the features indicated in the claims are further specified and explained in the description, wherein further preferred embodiments of the invention are illustrated.

The burner can also be operated in either injector mode or pilot mode as previously explained.

For the purposes of the present invention, the term “unit” is understood to mean any unit that can be used for melting down metallic, non-ferrous metallic along with non-metallic scrap and/or materials, for superheating the respective melts and/or for keeping them warm. The specified scrap and/or materials may comprise iron, copper, steel, aluminum, various precious metals, electrical scrap, glasses, glass scraps and various plastics.

Therefore, preferred meltdown units are selected from the series comprising a basic oxygen furnace (BOF), an argon oxygen decarburization converter (AOD), a submerged arc furnace (SAF), an electric arc furnace (EAF), a shaft arc furnace (SHARC), a primary energy melter (PEM), converter arcing (CONARC), a walking beam furnace, a walking hearth furnace, a pusher furnace, a single-chamber melting and casting furnace, a multi-chamber furnace, a universal rotary tilting furnace (URTF), a compact remelting plant (CTRP), a chip remelting furnace, a top blown rotary refiner (TBRR), a Peirce-Smith converter (PSC), an anode furnace, a drum furnace, a shaft furnace, a cupola furnace, a hearth furnace, a tilting furnace, a Kivcet furnace, a bath melting furnace and/or a pot furnace.

The oxygen-rich gas can be selected from oxygen, air or oxygen-enriched air.

In an advantageous design variant, the inlet pressure of the oxygen-rich gas is varied with respect to the inlet pressure of the fuel gas by a factor in the range of 2 to 12, preferably by a factor in the range of 3 to 10, more preferably by a factor in the range of 4 to 9.5. The inlet volumetric flow rate of the oxygen-rich gas is preferably varied with respect to the inlet volumetric flow rate of the fuel gas by a factor in the range of 1.05 to 2.0, more preferably by a factor in the range of 1.10 to 1.90, even more preferably by a factor in the range of 1.20 to 1.80.

In a further advantageous design variant, the oxygen-rich gas is injected with respect to a design state of the burner at an inlet pressure in the range of 0.50 to 1.50, preferably at an inlet pressure in the range of 0.60 to 1.40.

Furthermore, it is advantageously provided that the oxygen-rich gas is injected with respect to a design state of the burner at an inlet volumetric flow rate in the range of 0.50 to 1.50, preferably at an inlet volumetric flow rate in the range of 0.60 to 1.40, more preferably at an inlet volumetric flow rate in the range of 0.70 to 1.30, even more preferably at an inlet volumetric flow rate in the range of 0.80 to 1.20.

The invention and the technical environment are explained in more detail below with reference to the figures. It should be noted that the invention is not provided to be limited by the exemplary embodiments shown. In particular, unless explicitly shown otherwise, it is also possible to extract partial aspects of the facts explained in the figures and combine them with other components and findings from the present description and/or figures. In particular, it should be noted that the figures and especially the size relationships shown are only schematic. Identical reference signs designate identical objects, such that explanations from other figures can be used as a supplement if necessary.

DETAILED DESCRIPTION

Figures 1A, 1B, 1C:
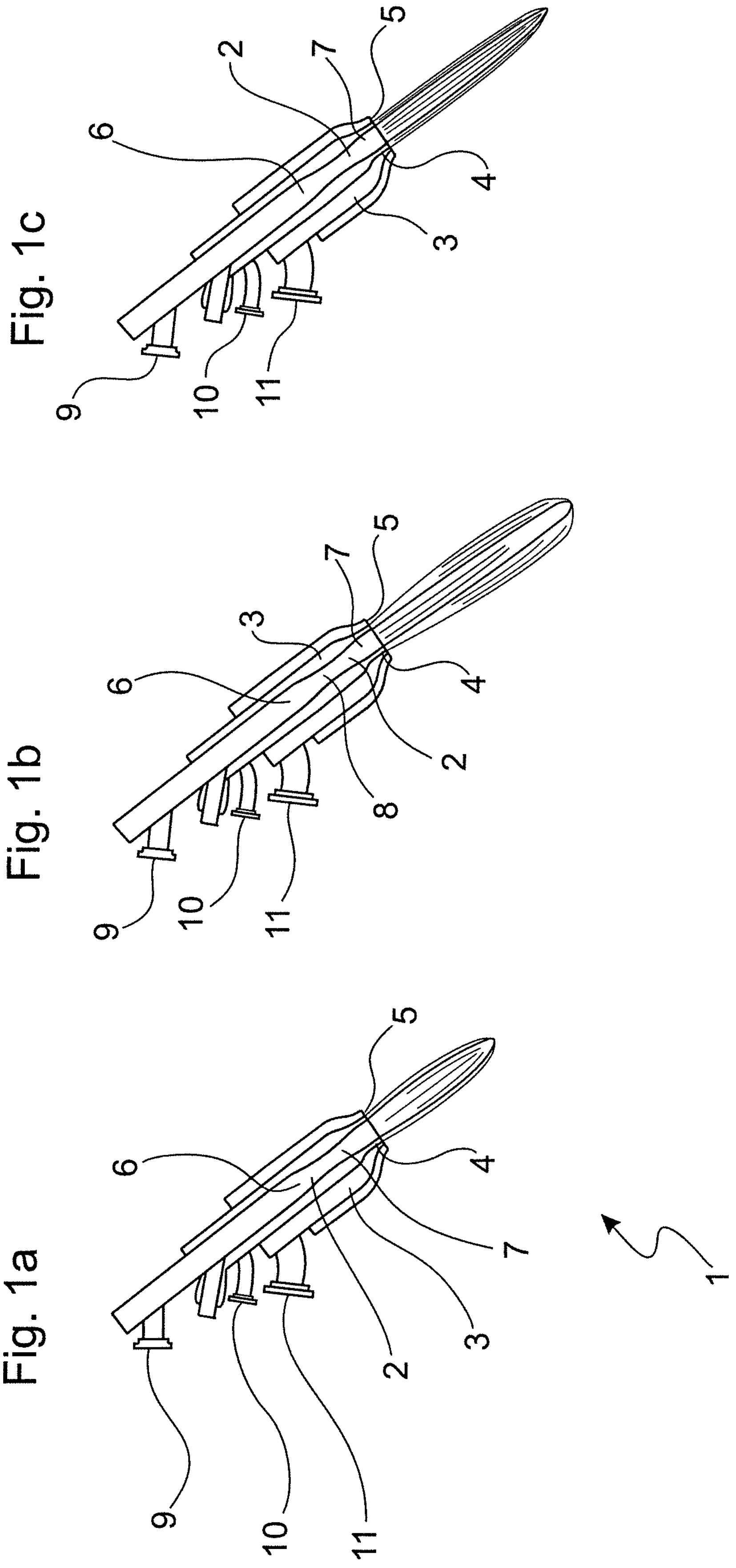
FIGS. 1*a* to 1*c* show a design variant of a burner in different operating phases.

FIGS. 1*a* to 1*c* show a design variant of a burner 1 in different operating phases. The burner 1 is suitable for simultaneously injecting a fuel gas and an oxygen-rich gas, and comprises a primary nozzle 2 for injecting the oxygen-rich gas, which primary nozzle is designed as a supersonic nozzle and a coaxial nozzle 3 having an annular outlet opening 4, which coaxial nozzle is designed as a subsonic nozzle and is coaxial to the primary nozzle 2, which is located at an end face 5 of the burner 1. As shown by the illustration, the primary nozzle 2 has a convergent portion 6 and a divergent portion 7, which adjoin each other at a radius of the narrowest cross-section 8. The primary nozzle 2 has a port 9 at the rear region of the burner 1, through which the oxygen-rich gas, such as pure oxygen, can be guided to the burner 1 from a valve station (not shown). In the present design variant, the coaxial nozzle 3 has two ports 10, 11. Fuel gas can be supplied to the burner 1 through the rear port 10 and air can be supplied through the front port 11. In burner mode, the fuel gas can also be supplied to burner 1 via the port 11.

Figure 2A:
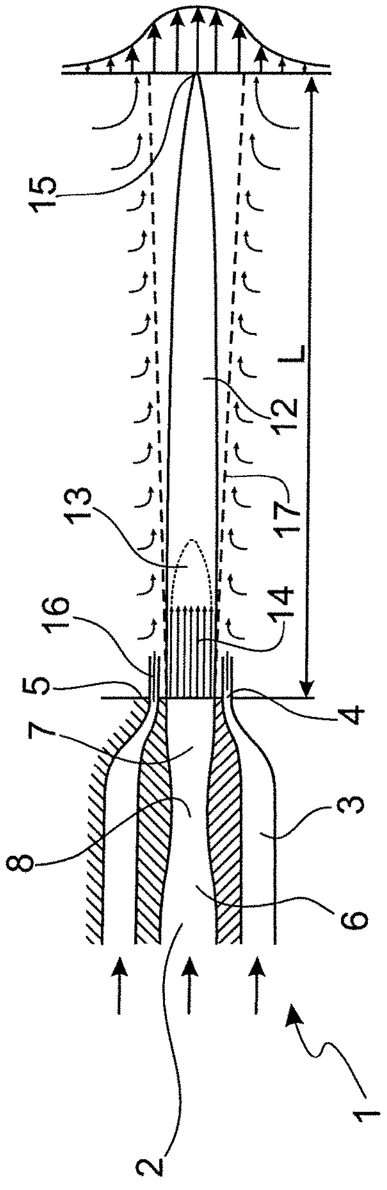
FIGS. 2*a* to 2*c* show a schematic illustration of the different states of the burner.
Figure 2B:
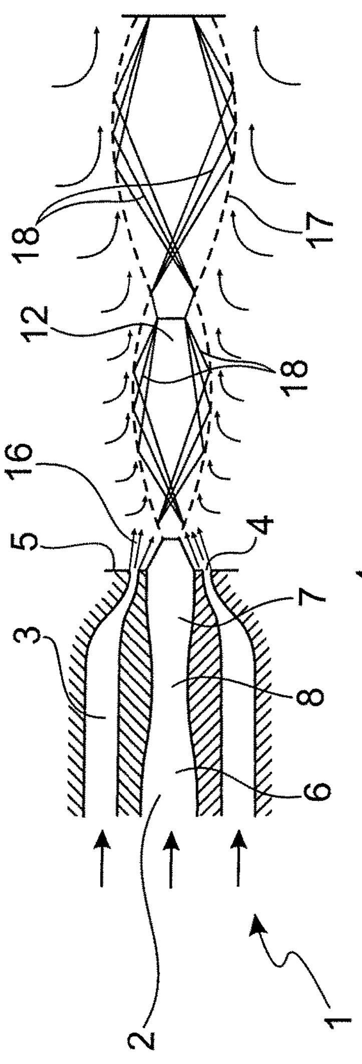
Figure 2C:
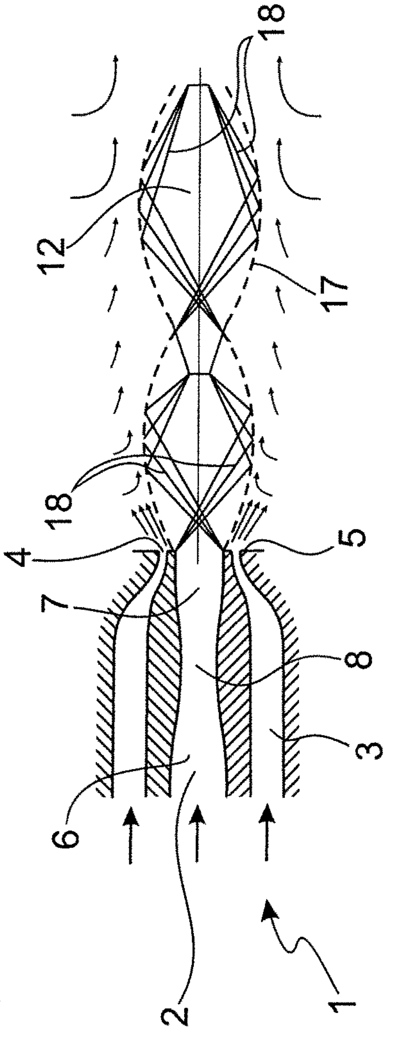

FIGS. 2*a* to 2*c* show a schematic illustration of the different states with the corresponding flame patterns of burner 1.

FIG. 2*a* shows the design state. The design state is present if, for a correctly designed Laval nozzle 2, the actual inlet pressure and inlet volumetric flow rate correspond to the so-called design pressure and design volumetric flow rate. The pressure at the outlet of the primary nozzle 2 then corresponds to the ambient pressure. In the design state, the oxygen-rich gas exits from the primary nozzle with maximum impulse flow, wherein the structure of the so-called supersonic free jet 12—in contrast to the classic subsonic free jet—is undisturbed and coherent. Consequently, its length L is also maximum. Therefore, the flame pattern is less pulsating.

Directly behind the outlet of the primary nozzle 2, a free jet core 13 is formed, in which the flow velocity, pressure and temperature are approximately constant. Such behavior is indicated in FIG. 2*a* by the homogeneous velocity profile 14, which is maximum in the design state. Downstream of the free jet core 13, the flow velocity, the pressure and the temperature decrease as a result of the increasing friction or dissipation effects, as the case may be, until the supersonic free jet 12 of the length L changes from the supersonic to the subsonic state at point 15. Consequently, the point 15 marks the position where the Mach number is equal to one (Ma=1). The premixed fuel gas free jet 16 exiting coaxially and parallel to the primary nozzle 2 from the coaxial nozzle 3 initially mixes only slightly with the significantly faster oxygen-rich jet, i.e. the fuel gas is only moderately entrained via the initially small vortex structures in a free jet shear layer 17. Such free jet shear layer 17 characterizes the interface between the primary and secondary jets 12, 16. The vortex size in the free jet shear layer 17 remains constant for a more or less long distance before the vortex size increases and more fuel gas is drawn in. The entire jet, i.e. the primary and secondary jets 12, 16, widens and slows down. The flame formed is long, efficient and the temperature maximum is well away from burner 1, which serves to protect burner 1 and its immediate surroundings in the meltdown unit. The burner mode according to FIG. 2*a* can be used primarily for superheating and keeping a melt warm over a long distance.

FIG. 2*b* shows an over-expanded state. This is characterized by a smaller inlet pressure compared to the design pressure. At the outlet of the primary nozzle 2, the oxygen-rich gas expands more than intended by the design state, such that so-called compression shocks are formed. As a result, more fuel gas is drawn into the oxygen-rich gas or the oxidizer free jet, as the case may be, and combustion occurs much earlier.

A compression shock is associated with an unsteady change in pressure, temperature, density, entropy, Mach number and flow velocity. While the pressure, temperature, density and entropy increase, the Mach number and flow velocity decrease. The free jet 12 constricts and the pressure in the center of the free jet 12 increases downstream to values above ambient pressure. The oblique compression waves 18 are reflected at the free jet edge 17 as expansion waves and the static pressure in the free jet 12 decreases. This process repeats periodically until the growing mixing zones at the free jet edge 17 dominate the flow field and the supersonic free jet 17 is transformed into a subsonic free jet.

The flow states significantly influence the mixing with the coaxially flowing secondary jet 16. Due to the downstream increasing interaction between the overlapping compression and expansion waves 18 and between the oxygen-rich gas and fuel gas, more fuel gas is drawn into the free jet 12, resulting in much earlier combustion. The flame becomes shorter than in the design state.

If, on the other hand, the inlet pressure is greater than the design pressure, the so-called under-expanded state is present (FIG. 2*c*). Expansion waves 18 attach to the outlet edge of the primary nozzle 2 and the free jet expands outside the primary nozzle 2. Moreover, in the under-expanded state, the coaxially outflowing fuel gas mixes intensively with the oxygen-rich gas in such a manner that the flame becomes even shorter and even wider than in the over-expanded state.

FIGS. 3 to 4 show results of a CFD simulation for the method in accordance with the invention. The following parameters were used for the simulation.

Burner output: 5 MW

Diameter of the narrowest cross-section of the primary nozzle: 15.4 mm

Outlet diameter of the primary nozzle: 21.3 mm

Gap height at the outlet of the coaxial nozzle: 6.1 mm

For the design state, the fuel gas, which consisted of a 50/50% by volume mixture of hydrogen and methane, was injected at an inlet volumetric flow rate of 773 $Nm^3$/and at a pressure of 1.2 bar. The oxygen-rich gas (100% by volume oxygen) was injected at an inlet volumetric flow rate of 1159 $Nm^3/h$ and at a pressure of 8.3 bar. Such values correspond to a lambda value of 1.2.

For the over-expanded state, the oxygen-rich gas (100% by volume oxygen) was then injected at an inlet flow rate of 774 $Nm^3/h$ and at a pressure of 5.1 bar. Such values correspond to a lambda value of 1.0.

Figure 3A:
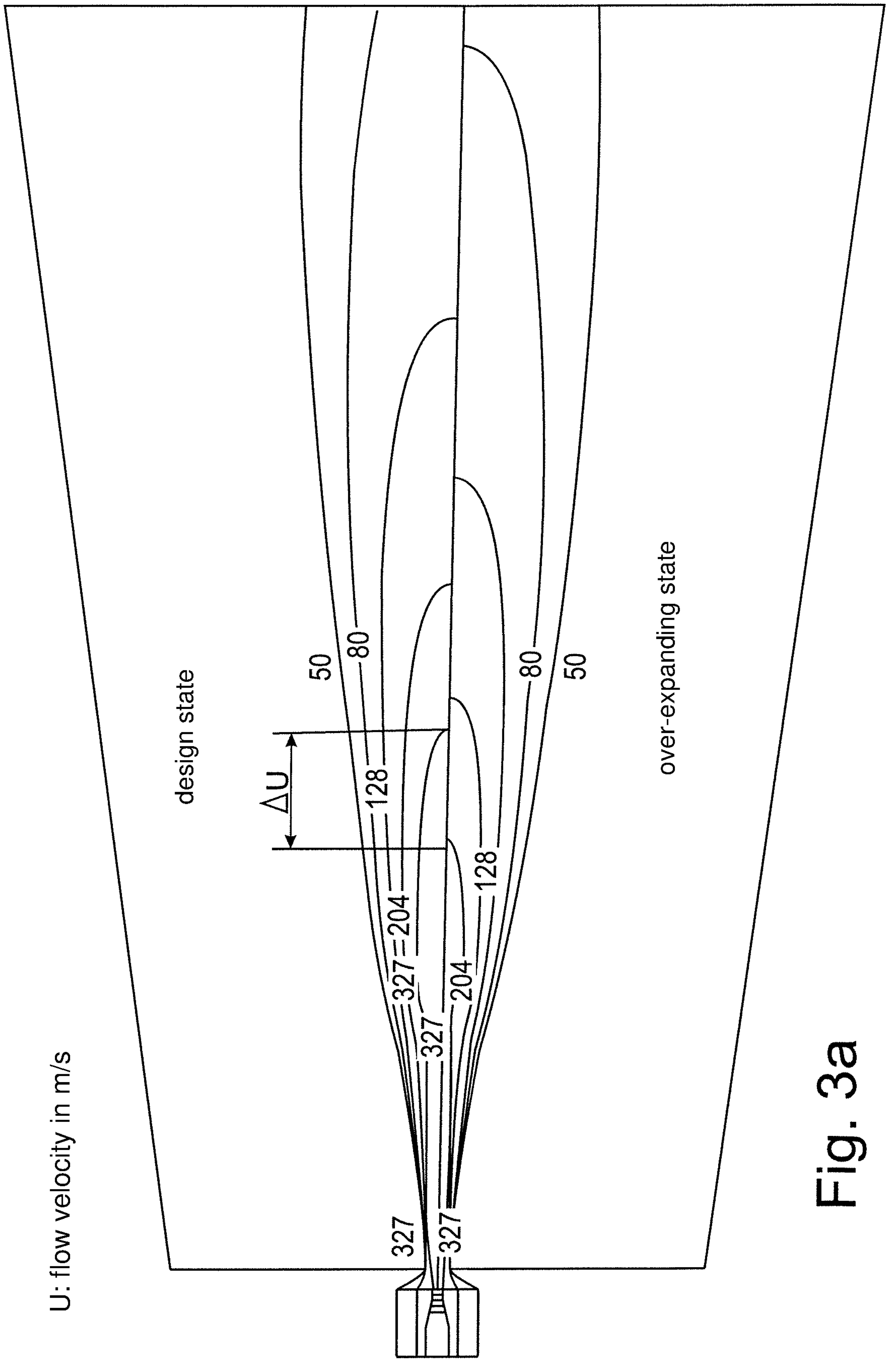
FIGS. 3*a* and 3*b* show a comparison of a flame pattern in the designed and over-expanded state.
Figure 3B:
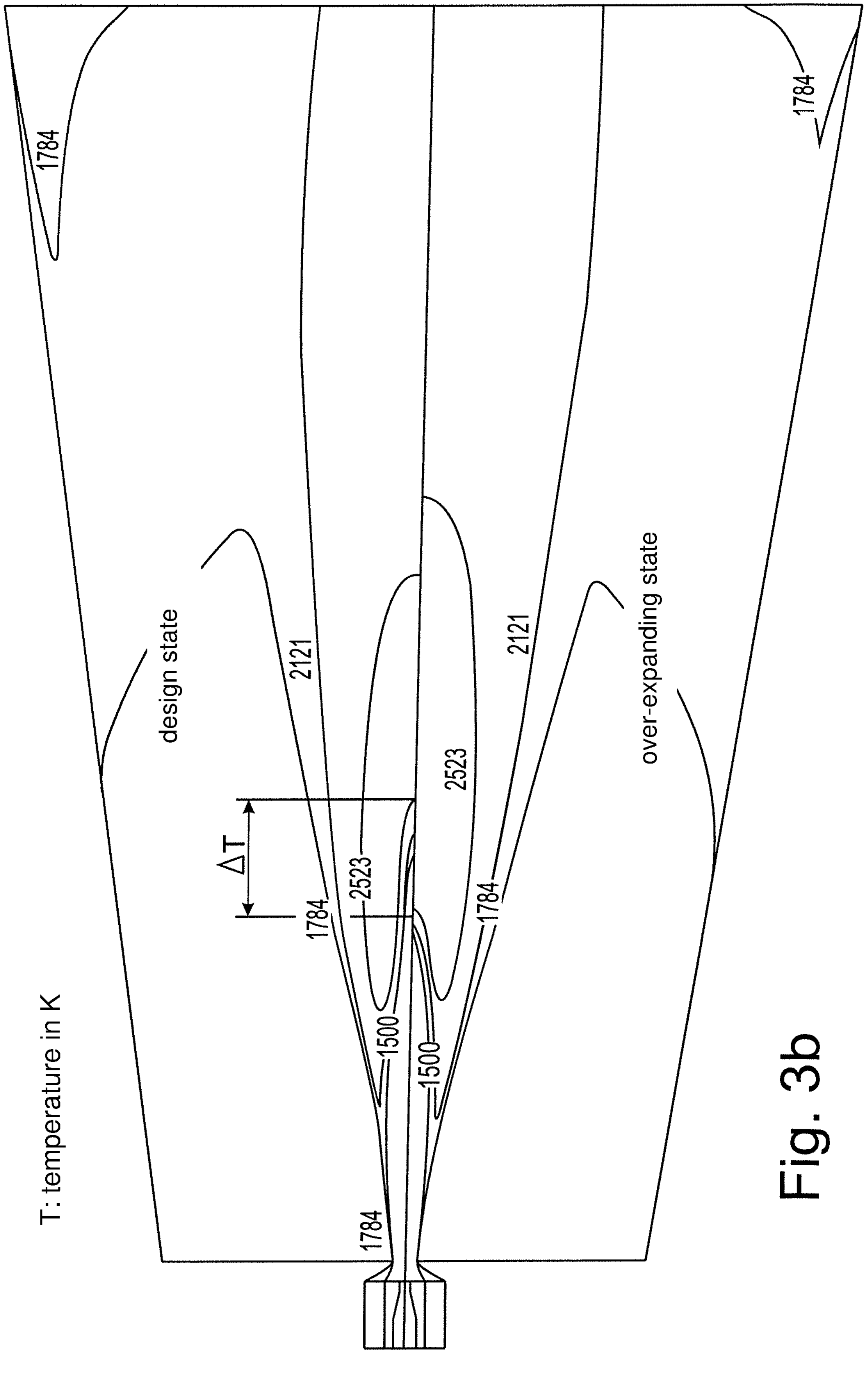
Figure 4A:
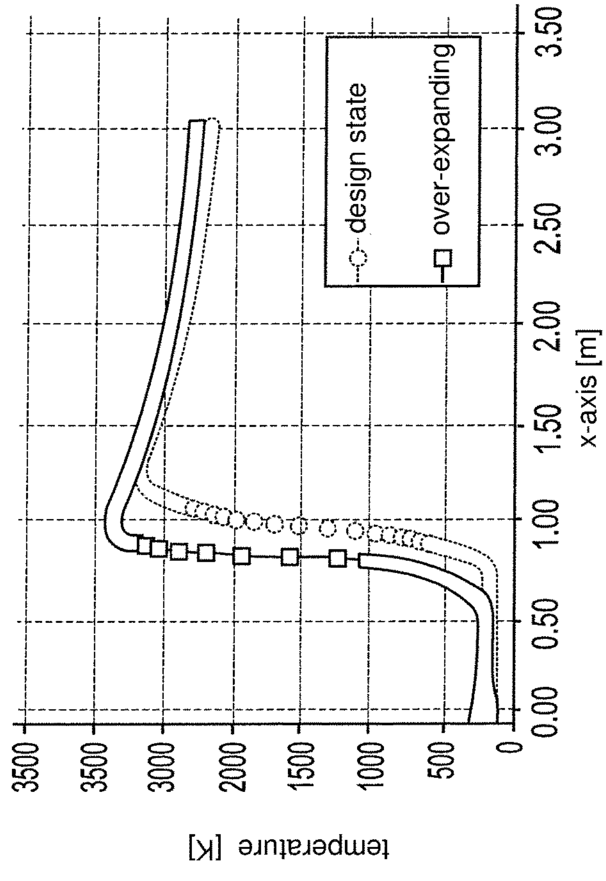
FIGS. 4*a* and 4*b* show a graphical illustration of the determined values of the respective flames from FIGS. 3*a*/3*b* in a diagram.
Figure 4B:
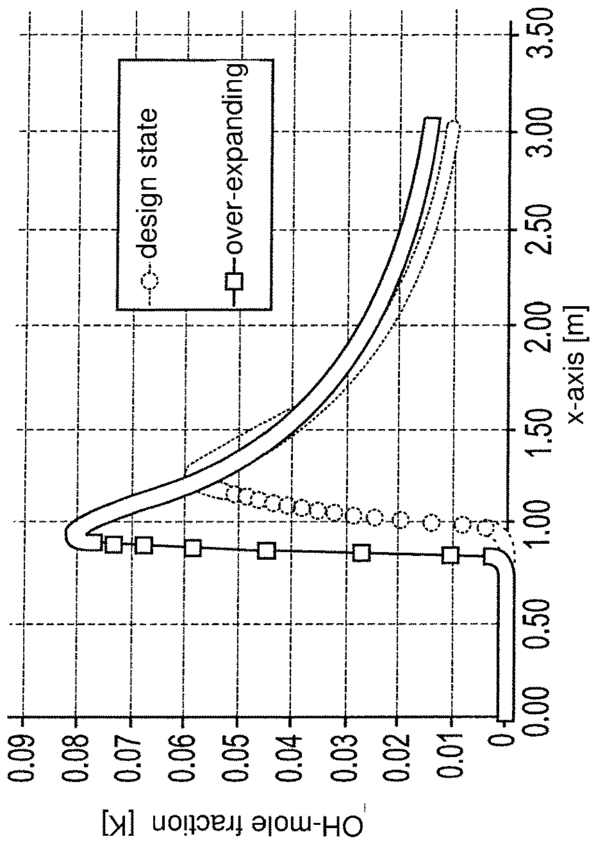

FIGS. 3*a* and 3*b* show the flow velocities of the two simulated flames (FIG. 3*a*) and the temperature field (FIG. 3*b*). As can be seen from the figures, a significantly shorter flame is formed in the over-expanding state, since the mixing and ignition of the fuel gas and oxygen occurs at an early stage. FIGS. 4*a* and 4*b* show the graphical illustration of the determined values of the respective flames from FIGS. 3*a* and 3*b*. OH concentration and flame temperature along the flame centerline are also shown. Depending on the definition of the flame length, a reduction in the range of 20 to 24% occurs by operating burner 1 in the over-expanding mode.

LIST OF REFERENCE SIGNS

1 Burner
2 Primary nozzle/Laval nozzle
3 Coaxial nozzle
4 Outlet opening
5 End face
6 Convergent portion
7 Divergent portion
8 Radius of the narrowest cross-section
9 Port for oxygen-rich gas
10 Port for combustion gas
11 Port for air/fuel gas
12 Supersonic free jet/primary jet/free jet
13 Free jet core
14 Velocity profile
16 Point
16 Fuel gas free jet/secondary jet
17 Free jet shear layer/free jet edge
18 Compression waves
L Length

The invention claimed is:

1. A method for simultaneously injecting a fuel gas and an oxygen-rich gas into a unit, comprising:

providing a burner (1) which comprises a primary nozzle (2) for injecting the oxygen-rich gas, the primary nozzle being designed as a supersonic nozzle having a convergent portion (6) and a divergent portion (7) which adjoin each other at a radius of a narrowest cross-section (8), and a coaxial nozzle (3) having an annular outlet opening (4) for injecting the fuel gas located at an end face (5) of the burner (1), the coaxial nozzle being designed as a subsonic nozzle and being arranged coaxial to the primary nozzle (2);

injecting the fuel gas, in the form of hydrogen or in the form of a fuel-gas mixture of hydrogen and a hydrocarbon-containing gas, at a fixed inlet pressure and a fixed inlet volumetric flow rate with respect to a planned thermal power of the burner (1); and varying an inlet pressure and an inlet volumetric flow rate of the oxygen-rich gas, thereby switching operation of the burner between a design state and a non-adapted state, wherein the design state of the burner is defined by a design inlet pressure and design inlet volumetric flow rate that lead to a pressure at the outlet of the primary nozzle to correspond to an ambient pressure, whereby the oxygen-rich gas exits from the primary nozzle with a maximum impulse flow, and wherein the non-adapted state of the burner is an over-expanded state characterized by an inlet pressure being smaller than the design inlet pressure, or an under-expanded state characterized by an inlet pressure being greater than the design inlet pressure.

2. The method according to claim 1, wherein the hydrocarbon-containing gas is natural gas.

3. The method according to claim 1, wherein the inlet pressure of the oxygen-rich gas is varied with respect to the inlet pressure of the fuel gas by a factor in the range of 4 to 9.5.

4. The method according to claim 1, wherein the inlet volumetric flow rate of the oxygen-rich gas is varied with respect to the inlet volumetric flow rate of the fuel gas by a factor in the range of 1.20 to 1.80.

5. The method according to claim 1, wherein the oxygen-rich gas is injected at an inlet pressure in the range of 0.60 to 1.40 times the design pressure.

6. The method according to claim 1, wherein the oxygen-rich gas is injected at an inlet volumetric flow rate in the range of 0.80 to 1.20 times the design volumetric flow rate.

7. The method according to claim 1, wherein the unit is selected from the group consisting of a basic oxygen furnace (BOF), an argon oxygen decarburization converter (AOD), a submerged arc furnace (SAF), an electric arc furnace (EAF), a shaft arc furnace (SHARC), a primary energy melter (PEM), a converter arcing (CONARC), a walking beam furnace, a walking hearth furnace, a pusher furnace, a single-chamber melting and casting furnace, a multi-chamber furnace, a universal rotary tilting furnace (URTF), a compact remelting plant (CTRP), a chip remelting furnace, a top blown rotary refiner (TBRR), a Peirce-Smith converter (PSC), an anode furnace, a drum furnace, a shaft furnace, a cupola furnace, a hearth furnace, a tilting furnace, a Kivcet furnace, a bath melting furnace, and a port furnace.

8. A method for adjusting a flame pattern of a burner (1) which comprises a primary nozzle (2) for injecting an oxygen-rich gas, the primary nozzle being designed as a supersonic nozzle having a convergent portion (6) and a divergent portion (7) which adjoin each other at a radius of a narrowest cross-section (8), and a coaxial nozzle (3) having an annular outlet opening (4) for injecting a fuel gas located at an end face (5) of the burner (1), the coaxial nozzle being designed as a subsonic nozzle and being arranged coaxial to the primary nozzle (2), the method comprising:

injecting the fuel gas, in the form of hydrogen or in the form of a fuel-gas mixture of hydrogen and a hydrocarbon-containing gas, at a fixed inlet pressure and a fixed inlet volumetric flow rate with respect to a planned thermal power of the burner (1); and varying the inlet pressure and the inlet volumetric flow rate of the oxygen-rich gas, thereby switching operation of the burner between a design state and a non-adapted state, wherein the design state of the burner is defined by a design inlet pressure and design inlet volumetric flow rate that lead to a pressure at the outlet of the primary nozzle to correspond to an ambient pressure, whereby the oxygen-rich gas exits from the primary nozzle with a maximum impulse flow, and wherein the non-adapted state of the burner is an over-expanded state characterized by an inlet pressure being smaller than the design inlet pressure, or an under-expanded state characterized by an inlet pressure being greater than the design inlet pressure.

* * * * *